United States Patent [19]
Honold et al.

[11] 3,811,687
[45] May 21, 1974

[54] SHAFT SEAL
[75] Inventors: Ernst Honold, Frankenthal; Werner Hubner; Hans-Dieter Sturm, both of Beindersheim, all of Germany
[73] Assignee: Klein, Schanzlin & Becker Aktiengesellschaft, Frankenthal Pfalz, Germany
[22] Filed: Feb. 3, 1972
[21] Appl. No.: 223,207

[30] Foreign Application Priority Data
Nov. 17, 1971 Germany............................ 2156953

[52] U.S. Cl........................ 277/28, 277/65, 277/73
[51] Int. Cl........................ F16j 15/34, F16j 15/54
[58] Field of Search.............. 277/3, 27, 28, 65, 73, 277/58, 59

[56] References Cited
UNITED STATES PATENTS
3,580,587  5/1971  Born .................................... 277/28
3,600,109  8/1971  Paulichenko ........................ 277/28
3,701,535  10/1972 Born .................................... 277/28
FOREIGN PATENTS OR APPLICATIONS
285,078  10/1962  Netherlands........................ 277/28

Primary Examiner—George E. Lowrance
Assistant Examiner—Robert I. Smith
Attorney, Agent, or Firm—Michael S. Striker

[57] ABSTRACT

A shaft seal for reactor pumps has a rotary shaft surrounded by an element stationary relative to the shaft and defining with the same an annular clearance opposite open ends of which are exposed to fluid at high pressure and to the atmospheric pressure, respectively. A hydrostatic seal is located in the clearance adjacent the end exposed to fluid under pressure and includes a first ring rotatable with the shaft and a non-rotatable second ring which is urged into axial engagement with the first ring. A mechanical seal is located in the clearance adjacent the open end exposed to atmospheric pressure and between the two seals a chamber is provided which is connected via first and second passages with the opposite open ends of the clearance. Two fixed throttles are provided in these passages and a valve is located in the passage connecting the chamber with the end exposed to atmospheric pressure and can be opend and closed.

4 Claims, 1 Drawing Figure

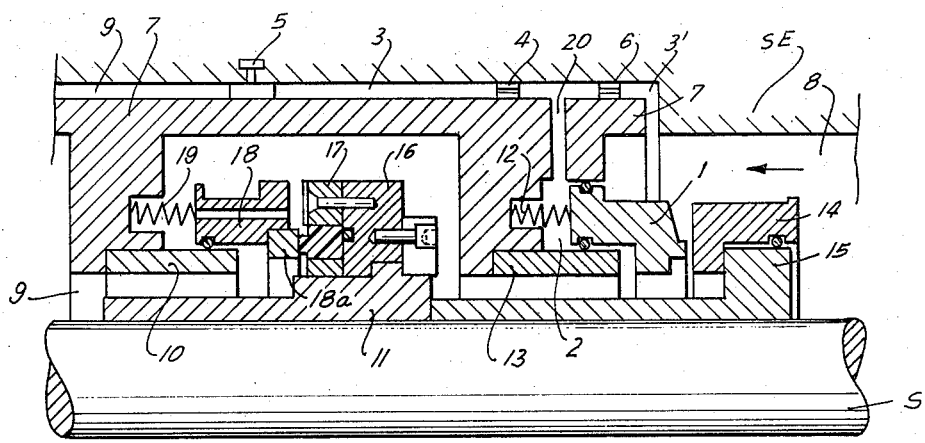

SHAFT SEAL

BACKGROUND OF THE INVENTION

The present invention relates to shaft seals in general, and in particular to shaft seals for reactor pumps.

It is already known to provide various different types of shaft seals, and in particular shaft seals which are used in reactor pumps, for instance in nuclear reactors. Two basic types of such shaft seals are known, namely hydrostatic shaft seals and mechanical shaft seals. Neither type is, however, fully satisfactory because hydrostatic shaft seals are endangered and not reliable at low pressures such as for instance occur primarily when the pump is started up, whereas mechanical shaft seals are endangered and therefore not reliable at higher pressures.

The problems arise from the fact that reactor pumps in particular are always mounted in a vertical orientation, that is the shaft of the pump impeller is vertically orientated. This means that the weight of the uppermost ring in a hydrostatic shaft seal must be supported by the film of liquid which is located between the rings and, if differential pressures occur above the hydrostatic shaft seal which are too low, the film of liquid is squeezed out between the rings by the weight of the uppermost one so that the rings can contact one another and, inasmuch as there is relative rotation between them, wear will take place.

On the other hand, mechanical shaft seals have the disadvantage that the sealing rings —which again rotate relative to one another— are pressed into tight engagement with one another by the pressure whose escape they are to prevent. If this pressure becomes too high, then the high force acting upon the rings in a sense pressing them together, can damage the rings.

SUMMARY OF THE INVENTION

Accordingly, it is a general object to provide an improved shaft seal of the type here under discussion which is not possessed of the disadvantages outlined above with respect to the prior art.

More particularly it is an object of the present invention to provide such an improved shaft seal, particularly for reactor pumps, which is simple but nevertheless reliably avoids the disadvantages of the prior art.

A further object of the invention is to provide such a shaft seal which has a first sealing stage utilizing a disengageable hydrostatic seal, and a second sealing stage utilizing a mechanical seal.

In pursuance of these objects, and of others which will become apparent hereafter, one feature of the invention resides in a shaft seal, particularly in reactor pumps, which briefly stated comprises a rotary shaft and an element surrounding the shaft and defining therewith an annular clearance having one open end exposed to fluid at high pressure and another open end exposed to atmospheric pressure. A hydrostatic seal is located in this clearance adjacent the one open end and includes a first ring rotatable with the shaft, and a non-rotatable second ring cooperating with the first ring axially adjacent the same at a side remote from the one open end and slidable axially to and away from the first ring. A mechanical seal is located in the clearance adjacent the open end, and a chamber is provided in the clearance intermediate the second ring and the mechanical seal. A first and a second passage are provided, each communicating with the chamber and each also communicating with the one or the other open end, respectively, and throttling means is located in each of these first and second passages. Finally, there is also provided valve means which is located in the second passage and can be operated to open or close the same at will.

With such a construction according to the present invention the sealing function will be carried out by the mechanical shaft seal, that is the mechanical sliding ring seal, in the lower pressure range. On the other hand, in the higher pressure range, for instance above 40 atmospheres, the pressure is substantially reduced via the hydrostatic shaft seal so that the mechanical sliding ring seal now needs to provide sealing only against a relatively small residual pressure. The pressure at which the sliding ring seal becomes effective can of course be selected higher or lower than 40 atmospheres, depending upon the size and type of the seals the value can be substantially higher or substantially lower.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a somewhat diagrammatic fragmentary axial section illustrating an embodiment of the invention.

DESCRIPTION OF THE PREFERRED EMBODIMENTS

Discussing the drawing in detail it will be seen that we have illustrated a rotary shaft S which is surrounded with clearance by a stationary element SE. As pointed out before, if the shaft seal is provided in a reactor pump the orientation of the shaft will usually be vertical or nearly so.

Located in the clearance between the shaft S and the element SE is a hydrostatic shaft seal which comprises a sliding ring 14 mounted on a sleeve 15 and cooperating axially with the movable ring 1 which does not rotate but can slide on the sleeve 13 and is permanently biased towards the ring 14 by biasing means which is here illustrated in form of springs 12 (one shown).

One end of the clearance, in the illustrated embodiment the right-hand end identified with reference numeral 8, is exposed to high fluid pressure whereas the other end, in the illustrated embodiment the left-hand end 9 is exposed to low fluid pressure, for instance to atmospheric pressure. Downstream of the hydrostatic shaft seal, that is downstream as seen with respect to the tendency of fluid to flow from the high-pressure end 8 to the low-pressure end 9 as indicated by the arrow at the end 8, there is located in the clearance a mechanical shaft seal having a slidable ring 17 which may for instance be composed of three concentric ring portions (illustrated but not separately designated which are unified by shrink-fitting them together. The ring 17 is for instance screw connected with the sleeve 11 surrounding the shaft S, via the intermediary of a supporting ring 16. A counter ring 18 cooperates with the ring 17, being for instance of the type in which a hard-metal annulus 18a is secured by shrink-fitting or the like. The ring 18 with the annulus 18a can slide on the sleeve 10 which is mounted in a housing 7, and is permanently urged into sealing abutment with the ring 17 by biasing means, here illustrated as spring 19 (one shown).

It should be emphasized that other mechanical glide ring seals or shaft seals can be utilized in place of the one illustrated, and that the illustrated type has been shown only for purposes of information and orientation.

When the construction according to the present invention and as discussed thus far, is started up, that is when the shaft S begins to rotate, the hydrostatic shaft seal is lifted off and the relatively low pressure above the mechanical seal is reduced. If the pressure in the system increases above a value which can be selected at will, then the hydrostatic seal is engaged and then serves to reduce the pressure to such an extent that the only residual pressure acting upon the mechanical shaft seal is so low that it can readily provide a seal in the face of this pressure without becoming damaged in any way.

It will be seen that to the left or downstream of the non-rotatable ring 1 of the hydrostatic ring seal there is provided a chamber 2. This chamber 2 is connected via a passage 3 with the end 9 which is at atmospheric pressure, and the chamber 2 is further connected via a passage 3' with the end 8 which is at high pressure. Located in the passage 3 is a fixed throttling device 4, and a similar fixed throttling device 6 is located in the passage 3'. The devices 4 and 6 cannot be adjusted, as is indicated by the above reference to them as being fixed, and they may be in form of a tubular coil or a throttle bore provided in cylindrical element, in a disk-shaped element or the like. Such throttling elements as those identified with reference numerals 4 and 6 are well-known per se and need not be further described.

Also located in the passage 3 is a valve which also need not be further described because it can be conventional, being well-known per se, and which serves for opening or completely closing the passage 3.

To obtain lift-off the chamber 2 is pressure-relieved via the passage 3, by opening the valve 5. In order to prevent the ring 1 from impacting too rapidly and therefore too hard, its lift-off speed is reduced by the fixed throttle 4 in the passage 3 so that, when the passage 3 is opened by requisite operation of the valve 5, the speed at which pressure fluid can be expelled from the chamber 2 by the ring 1 which tends to move towards the left into the chamber 2 under the influence of the high pressure acting upon it from the open end 8, is throttled and controlled by the rate at which such pressure fluid can escape through the throttling device 4.

On the other hand, when the system pressure rises above a previously determined value, the valve 5 is closed. This causes a rise of pressure in the chamber 2 and the springs 12 urge the ring 1 to operative position into cooperation with the ring 14. This, also, should not take place too rapidly with correspondingly hard impingement of the ring 1 upon the ring 14. To assure that this movement of the ring 1 towards the right in the drawing takes place relatively slowly, the chamber 2 is filled with pressure fluid from the open end 8 via the throttle 6 in the passage 3', the inflow of pressure fluid from the open end 8 into the chamber 2 again being controlled by the amount of flow which is permitted by the fixed throttle 6.

With the present invention the disadvantages of the prior art have been overcome, and the dangers which have been outlined above with respect to known hydrostatic ring seals as well as known mechanical ring seals have been avoided.

It will be understood that each of the elements described above, or two or more together, may also find a useful application in other types of constructions differing from the types described above.

While the invention has been illustrated and described as embodied in a shaft seal construction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. A shaft seal, particularly in reactor pumps, comprising a rotary shaft; an element surrounding said shaft and defining therewith an annular clearance having one open end exposed to fluid at high pressure and an other open end exposed to atmospheric pressure; a hydrostatic seal in said clearance adjacent said one open end and including a first ring rotatable with said shaft, and a non-rotatable second ring cooperating with said first ring axially adjacent the same at a side remote from said one open end and slidable axially towards and away from said first ring; a mechanical seal in said clearance adjacent said other open end; a chamber intermediate said second ring and said mechanical seal; a first and a second passage each communicating with said chamber and respectively communicating with said one and said other open end; throttling means in each of said first and second passages; and valve means in said second passage and operable for closing the same.

2. A shaft seal as defined in claim 1, said throttling means comprising a pair of fixed throttles.

3. A shaft seal as defined in claim 1; further comprising biasing means in said chamber bearing upon and permanently urging said second ring axially towards said first ring.

4. A shaft seal as defined in claim 1, said mechanical seal comprising a rotatable ring member rotatable with said shaft, a non-rotatable ring member slidable axially of said rotatable ring member into and out of sealing engagement therewith, and spring means permanently biasing said non-rotatable ring member into sealing engagement with said rotatable ring member.

* * * * *